United States Patent Office 3,761,410
Patented Sept. 25, 1973

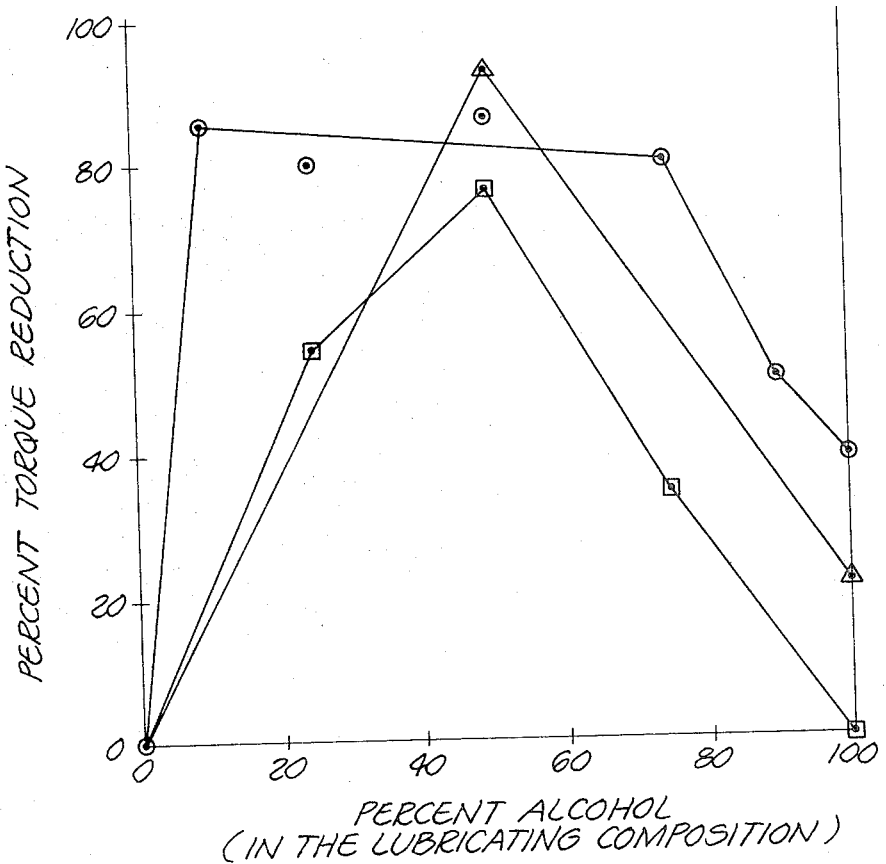

3,761,410
COMPOSITION AND PROCESS FOR INCREASING THE LUBRICITY OF WATER BASE DRILLING FLUIDS
Thomas C. Mondshine and Kenneth E. Watson, Houston, Tex., assignors to NL Industries, Inc., New York, N.Y.
Filed Mar. 22, 1971, Ser. No. 126,409
Int. Cl. C10m 3/18, 3/32
U.S. Cl. 252—8.5 C            12 Claims

ABSTRACT OF THE DISCLOSURE

The present invention provides water base drilling fluids having enhanced lubricating properties under low load, non-extreme pressure conditions by incorporating therein a material selected from the group consisting of vegetable oils, animal fats, fatty acids, fatty acid esters, fatty amides, their sulfurized or sulfated reaction products, and mixtures thereof, and a water insoluble alcohol having from four to fifteen carbon atoms. Another aspect of the invention provides a novel lubricating composition and process for synergistically increasing the lubricity of water base drilling fluids and the like.

BACKGROUND OF THE INVENTION

Field

This invention relates to drilling fluids and drilling processes and to novel lubricating compositons for use therein. It is particularly concerned with water base drilling fluids having improved lubricating characteristics under low load, non-extreme pressure conditions as evidenced by a reduction in the power required to rotate the drill pipe, a reduction in the drag of the drill pipe which occurs during vertical movement into and out of the hole, as, for example, to change the drill bit, a reduction in bit balling, a reduction in the tendency of the pipe to become stuck, and other valuable properties as disclosed herein.

Prior art

In the drilling of wells to recover fluids such as oil and/or gas from subterranean deposits, it is common practice to use a rotary drilling method in which a bit is rotated at the bottom of the bore hole by means of a rotating hollow drill pipe which extends to the surface. A circulating fluid known as a drilling fluid or drilling mud is pumped through the drill pipe where it emerges through openings in the drill bit and returns to the surface in the annular space between the drill pipe and the walls of the bore hole.

The drilling fluid upon emerging from the well may be treated mechanically to remove the cuttings, entrapped gas or other undesirable contaminants as well as weighting material and/or may be treated chemically to maintain, enhance, or decrease certain chemical or physical properties of the fluid. The drilling fluid is then recirculated by pumps down the drill pipe, this circulation being substantially continuous during drilling. Circulation of the drilling fluid is interrupted occasionally such as when an additional section of drill pipe is added at the top of the string of drill pipe or when the entire string of drill pipe is withdrawn to replace the bit.

The drilling fluid performs many functions which are vital to the success of the drilling process and in order to perform these functions it must possess certain desirable chemical and physical characteristics. Thus the drilling fluid must have sufficient viscosity to suspend and remove the cuttings from the borehole; it must have sufficient gel strength to hold solids in suspension, especially when the fluid is not circulating; it must have sufficient density to exert sufficient pressure to the sides of the borehole to prevent the entrance of fluids into the borehole from the formation being penetrated; it must have a low fluid loss to prevent excessive loss of fluid into the formation by depositing on the sides of the borehole a impervious filter cake; and it must lubricate not only the bearings and cutting surfaces of the drill bit but also the string of drill pipe upon rotation or vertical movement.

In the drilling of wells and particularly in directional drilling the friction between the string of drill pipe and the sides of the borehole may be large enough to interfere with running the pipe into and out of the hole. High friction between the drill pipe and the bore hole wall also increases torque and power required to rotate the drill pipe and the wear and stress on the drill pipe. These in turn cause danger of twist-offs of the pipe and may decrease the drilling rate.

The lubrication characteristics of drilling fluids has been the subject of many investigations as evidenced by the number of patents in the prior art. See for example the following United States patents: 2,773,030; 2,773,031; 3,014,862; 3,027,324; 3,047,493; 3,047,494; 3,048,538; 3,214,374; 3,242,160; 3,275,551; 3,340,188; 3,372,112; 3,377,276. These patents disclose many different types of additives for use in oil base drilling fluids, oil-in-water emulsion drilling fluids and water base drilling fluids. It has also been proposed to incorporate an emulsifier in water base drilling fluids where the lubricating additive to be used is insoluble in water.

Most of the prior art additives function as extreme pressure lubricants and added to the drilling fluid primarily to lubricate the bearings of the drill bit. Some of the prior art additives may also impart sufficient lubricity to the drilling fluid to decrease the power required to rotate the drill pipe by reducing the drill string torque. The additives in this case function by decreasing the friction occurring between the drill string and the sides of the borehole, thus increasing the lubricity of the drilling fluid.

It has been recognized in the prior art that despite the advances made in improving the lubricating characteristics of drilling fluids by the addition of additives therein, numerous disadvantages remain which limit the effectiveness of these prior art drilling fluids. Thus some of the prior art additives are not effective at a pH above about 10.5. Certain additives are not effective in the presence of calcium or other polyvalent cations. Some of the proposed additives adversely affect other properties of the drilling fluid while still others are not effective if oil is present in the drilling fluid. Certain of the proposed additives are sorbed onto the surface of the solids present in the drilling fluid which may deactivate the additive and may cause oil wetting of the solids, hence flocculation and settling, particularly of the barite present as a weighting material. Some additives cause the drilling fluid to foam while still others are difficult to disperse in the drilling fluid. Some lubricants cause the drilling fluid to fluoresce under ultraviolet light which interferes with certain well logging operatons performed to indicate the presence of oil in the formations being drilled. Many of the prior art additives must be used in such concentrations to be effective that it is uneconomical to use them.

SUMMARY OF THE INVENTION

We have now discovered that the lubricating characteristic of water base drilling fluids under low load, non-extreme pressure conditions, i.e., the lubricity, can be enhanced significantly by the addition to the water base drilling fluid of a lubricating additive and an alcohol as disclosed hereinafter. More particularly we have discovered that the addition of a water insoluble alcohol having from four to fifteen carbon atoms to a water base drilling fluid to which a lubricating additive is also added increases the lubricity of the water base drilling fluid to a much greater extent than does either the lubricating additive or the alcohol alone. This synergism which occurs enables low concentrations of the lubricating additive and the alcohol to be used in the drilling fluid.

It is an object of the present invention to provide a method of increasing the lubricity of a water base drilling fluid. Another object of this invention is to provide a method for increasing the lubricity of a water base drilling fluid comprising adding to said fluid a lubricating additive and a water insoluble alcohol having from 4 to 15 carbon atoms in such proportions to give an effect greater than the arithmetic sum of the effect obtained by adding either the lubricating additive or the alcohol alone. Still another object of this invention is to provide a method of synergistically increasing the lubricity of a water base drilling fluid containing a lubricating additive comprising adding to said fluid a water insoluble alcohol having from 4 to 15 carbon atoms. Still other objects of the present invention are to provide methods for reducing the power required to rotate the drill pipe during the drilling of an oil and/or gas well, for reducing the drag on the drill pipe which occurs while changing the bit during a drilling process, and for reducing the balling of the drill bits during a drilling process each comprising adding to the water base drilling fluid used in the drilling process either separately or concomitantly a lubricating additive and a water insoluble alcohol having from 4 to 15 carbon atoms. Yet another object is to provide water base drilling fluids having good lubricating properties under low load, non-extreme pressure conditions containing synergistic proportions of a lubricating additive and a water insoluble alcohol having from 4 to 15 carbon atoms. An object is to provide a composition for increasing the lubricity of a water base drilling fluid which is non-polluting, biodegradable, effective in a variety of water base drilling fluid compositions, and which is effective in the presence of oil in the drilling fluid comprising an admixture of a lubricating additive, preferably castor oil and/or sulfated castor oil, a water insoluble alcohol having from 4 to 15 carbon atoms, and a pour point depressant selected from the group consisting of methanol, ethanol, n-propanol, isopropanol, ethylene glycol, propylene glycol, and mixtures thereof.

Other objects and advantages of this invention will further become apparent hereinafter and in the drawing, in which the remarkable synergistic effect in increasing the lubricity of a water base drilling fluid which occurs upon adding to the drilling fluid various blends of sulfated castor oil and various alcohols is displayed.

DESCRIPTION OF THE PREFERRED EMBODIMENT

The term "water base" as used in describing the drilling fluids of this invention is used to distinguish these fluids from oil-in-water emulsion drilling fluids and from oil base drilling fluids. The term "water base" is thus used in connection with drilling fluids containing no oil intentionally added to the drilling fluid. The novel compositions disclosed herein are biodegradable and are effective in water base drilling fluids at low concentrations, such as from 1 to 12 lb./bbl., such that no petroleum oil need be added to obtain the lubrication characteristics desired. However, the novel compositions disclosed herein remain effective if oil enters the drilling fluid. For example, oil might enter the drilling fluid from the formation being drilled, or oil might be placed adjacent stuck pipe to loosen the pipe.

The term "lubricating additive" as used in connection with the novel invention disclosed herein refers to an organic material which may be added to drilling fluids to increase the lubricity thereof. The organic material may not actually be effective as a lubricant, however, unless it is used with an alcohol as disclosed herein in connection with the present invention.

The term "lubricity" as used in connection with the novel invention disclosed herein refers to that lubrication characteristic of drilling fluids which is dependent upon the friction which occurs between the drill pipe and drill collars and the filter cake on the walls of the borehole and/or the casing within the borehole. Hence it refers to that lubrication characteristic of drilling fluids operative under low load, non-extreme pressure conditions. A change in the lubricity of a drilling fluid can be determined by measuring the change in the coefficient of friction between two surfaces separated by the drilling fluid, by measuring the change in the torque between a rotating surface and a stationary surface separated by the drilling fluid, and by measuring the change in the power required to rotate one surface in proximity to a stationary surface separated by the drilling fluid. Thus an increase in the lubricity of a drilling fluid will be indicated by a decrease in the coefficient of friction, a decrease in torque, and a decrease in the power required to rotate the drill pipe.

The term "fatty" as used in connection with the novel invention disclosed herein refers to an aliphatic organic radical containing at least 12 carbon atoms. Aliphatic is here used in its broad sense as defined in Webster's Seventh New Collegiate Dictionary, 1963, G. & C. Merriam Co., Springfield, Mass., viz: belonging to a group of organic compounds having an open-chain structure and consisting of the paraffin, olefin, and acetylene hydrocarbons and their derivatives.

Lubricating additives useful in this invention may be selected from the group consisting of vegetable oils, animal fats, fatty acids, fatty acid esters, fatty amides, sulfurized vegetable oils, sulfated vegetable oils, sulfurized animals fats, sulfated animal fats, sulfurized fatty acids, sulfated fatty acids, sulfurized fatty acid esters, sulfated fatty acid esters, sulfurized fatty amides, sulfated fatty amides, sulfurized fatty alcohols, sulfated fatty alcohols, and mixtures thereof.

The following are typical lubricating additives useful in practicing this invention: vegetable oils—castor oil, soybean oil, cotton seed oil, sunflower oil, corn oil, coconut oil, pine oil; animal fats—fish oils, tallow; fatty acids—tall oil, oleic acid, linoleic acid, ricinoleic acid, tallow fatty acid, hydrogenated tallow fatty acid, lauric acid; fatty acid esters—sperm oil, methyloleate, ethyllinoleate, isopropylricinoleate, methyltallowate; fatty amides—oleamide, linoleamide, ricinoleamide, tallow amide.

Typical sulfurized compounds which can be used in practicing this invention are those unsaturated compounds given in the preceding paragraph sulfurized in any conventional manner such as by sulfurization with elemental sulfur, with phosphorus sulfide, or with sulfur halides. Such processes, well known in the art, are given in the Kirk-Othmer Encyclopedia of Chemical Technology, 2nd Edition, vol. 19, p. 499 (1969), Interscience Publishers, and various sources referenced therein.

Typical sulfated compounds which can be used in practicing this invention are those unsaturated compounds listed above sulfated by the addition of a molecule of sulfuric acid across a double bond at any point of unsaturation and/or by the reaction of sulfuric acid or other sulfur trioxide containing compound with a hydroxyly group in the molecule. The latter sulfation reaction can also occur with fatty alcohols. Typical well known processes for conducting the sulfation, sometimes also called sulfonation, are given in the Kirk-Othmer Encyclopedia of Chemical Technology, 2nd Edition vol. 19, pp. 302–305 (1969); in Fats and Oils, 2nd Edition, H. G. Kirschenbauer, pp. 89–91 (1960); and in Fatty Acids, 2nd Edition, K. S. Markley, Part 3, Chapter XVII, 1964.

The degree of sulfurization or sulfation is not critical in the practice of this invention. The combination of an alcohol having at least four carbon atoms with any sulfurized, sulfated, or un-modified additive of the types disclosed herein synergistically increases the lubricity of water base drilling fluids in accordance with the teachings of this invention.

Preferred lubricating additives useful in this invention are selected from the group consisting of vegetable oils, sulfated vegetable oils, and mixtures thereof.

Still more particularly preferred lubricating additives useful in this invention are selected from the group consisting of castor oil, sulfated castor oil, and mixtures thereof.

The alcohol useful in this invention may be any water insoluble alcohol having from four to fifteen carbon atoms. Representative of such alcohols are butanol, hexanol, octanol, 2-ethylhexanol, decanol, dodecanol, pentadecanol, and the like. Preferred alcohols are those primary alcohols containing from 8 to 15 carbon atoms.

The term "water insoluble alcohol" as used herein refers to those alcohols which are incompletely soluble in water at 20° C. The Handbook of Chemistry and Physics, 44th Edition, 1962, The Chemical Rubber Publishing Co., Library of Congress Card No. 13–11056, p. 888, indicates that n-butyl alcohol and sec-butyl alcohol have a solubility in grams per 100 milliliters of water at 20° C. of 7.9 and 12.5 respectively, whereas tert-butyl alcohol is soluble in water in all proportions. Thus tert-butyl alcohol is completely soluble in water and is excluded from this invention, whereas n-butyl alcohol and sec-butyl alcohol are incompletely soluble in water and are included in this invention.

The lubricating additive and the water insoluble alcohol can be added to a water base drilling fluid in any conventional manner such as through the mud hopper. They may be added separately or after mixing them together. The weight ratio of lubricating additive to alcohol effective in synergistically reducing the lubricity of water base drilling fluids is from about 19:1 to about 1:9, preferably from 19:1 to 1:1. The combined amount of lubricating additive and alcohol added to a water base drilling fluid should be sufficient to synergistically increase the lubricity of the drilling fluid, preferably from about 1 pound to about 12 pounds per 42 gallon barrel of the drilling fluid.

Mixing or blending together a lubricating additive and a water insoluble alcohol having from 4 to 15 carbon atoms to prepare a lubricating composition can be done in any conventional manner. Lubricating compositions containing from about 5% to 90% of the alcohol will synergistically increase the lubricity of water base drilling fluids to which they are added. Preferred are lubricating compositions containing from 5% to 40% of the alcohol.

Such lubricating compositions should contain materials to lower the pour point of the compositions. Particularly preferred for this function because of their biodegradability and low freezing point are the lower alcohols such as methanol, ethanol, n-propanol, isopropanol, ethylene glycol, and propylene glycol. Preferably from 5% to 30% of such pour point depressants are used in the compositions.

The preferred lubricating composition for the practice of this invention consists of 65% castor oil, 5% sulfated castor oil, 10% of a mixture of n-alkyl primary alcohols having an average molecular weight of 207 and having from 12 to 15 carbon atoms in the alkyl chain, and 20% isopropanol. An alcohol of substantially this composition is available as Neodol 25 from Shell Chemical Company.

The term "percent" as used in this specification and claims is meant to be percent by weight.

The lubricating additive and alcohol can be mixed with a solid sorbent to produce a dry powder if desired.

The mechanism by which the lubricating additive and the water insoluble alcohol synergistically increase the lubricity of water base drilling muds is not completely understood. Upon mixing these materials in a water base drilling fluid they become dispersed as discrete, small droplets. An emulsion is not formed since the droplets are much larger than the colloidal droplets required for an emulsion. Apparently the combination of a water insoluble alcohol having from 4 to 15 carbon atoms with a lubricating additive of the types disclosed herein produces a droplet which is readily available for adsorption on and the coating of a metal surface. Such a droplet apparently has more affinity for a metal surface than does an emulsified droplet which has a greater affinity for the water in which it is dispersed.

The water base drilling fluids in which the lubricating additive and water insoluble alcohol synergistically increase the lubricity may be based on fresh water, salt water, saturated salt water, sea water, or other waters normally used in preparing water base drilling fluids. Such drilling fluids normally contain a suspending agent such as calys or polymers, a weighting agent such as barite, a fluid loss control additive such as starch or carboxymethylcellulose, a viscosity control additive such as a lignosulfonate, and fine particle size drilled solids from the formations being drilled. The fastest drilling rate is normally obtained using water containing no solid materials as the drilling fluid.

In some of the examples of specific embodiments of the invention which follow a modified Baroid E. P. Tester has been used to measure the lubricity of drilling fluids. The Baroid E. P. Tester has been used for many years in the oil/gas well drilling industry for determining the extreme pressure characteristic of drilling fluids. It is a portable machine which performs the same function that a Timken E. P. Tester performs. The Baroid E. P. Tester was modified such that it could reproducibly determine the lubricity of drilling fluids by replacing the motor with a constant speed 60 r.p.m. motor, and by redesigning the test block and ring to provide a maximum area of contact. This was done by using a larger test ring and by machining the test block such that the test ring fits into and rotates within a concave cavity on a face of the test block. Thus when a torque of 150 inch-pounds is applied to the test ring with the lever arm holding the test block the force between the test block and test ring is 740 p.s.i. Before modification a force in the extreme pressure range of several thousand p.s.i. would have resulted.

The modified Baroid E. P. Tester is operated as follows: (1) the test ring and block, thoroughly cleaned, are immersed into the drilling fluid; (2) a load of 740 p.s.i. is slowly applied with the rotating test ring against the test block using the torque arm on the tester; (3) the amperage shown on the meter is recorded. The amperage recorded is directly related to the torque exerted between the test ring and test block.

The "precent torque reduction" can be calculated using the following formua:

$$\frac{I_b - I_a}{I_b - I_o} \times 100$$

where $I_b$ = amperage obtained before treatment of the drilling fluid with a lubricating composition.
$I_a$ = amperage obtained after treatment of the drilling fluid with a lubricating composition.
$I_o$ = amperage obtained at 0 load which is independent of the drilling fluid.

The results obtained with this modified Baroid E. P. Tester have shown good correlation with results obtained in actual practice. Thus the most particularly preferred lubricating composition of this invention when tested under field conditions as disclosed hereinafter drastically reduced the lubricity of a water base drilling fluid as measured with the drilling rig equipment.

The invention is further illustrated in the following examples which are not to be construed as limiting in scope.

EXAMPLE 1

A water base drilling fluid was prepared by mixing together 15 lb. Wyoming bentonite clay, 80 lb. Glen Rose shale, 3 lb. causticized ferrochrome lignosulfonate, and 3 lb. causticized lignite each per 42 gallon barrel of fresh water. These materials are all well known in the drilling fluid industry. The causticized ferro-chrome lignosulfonate and lignite are added to a drilling fluid to decrease the gel strength and viscosity. Glen Rose shale is a shale used in the laboratory preparation of drilling fluids for the purpose of simulating shales picked up by drilling mud during its use in a drilling process.

Four grams of the lubricating compositions listed in Table 1 were added to 350 ml. of this water base drilling fluid and mixed for 15 minutes on a multimixer. This corresponds to a concentration of 4 lb./bbl. The change in lubricity of the water base drilling fluid, as indicated by the precent torque reduction, was measured using the modified Baroid E.P. Tester. The data obtained are given in Table 1 in which it should be understood that those compositions which contain 0% and 100% alcohol are not included within the scope of the present invention, and are given for the specific purpose of illustrating the remarkable synergism in increasing the lubricity which results from an admixture of an alcohol as described herein and a lubricating additive as described herein.

TABLE 1

| | Lubricating compositions, 4 lb./bbl. | | | |
| | Percent | | | |
| Alcohol | Alcohol | Sulphated castor oil | Castor oil | Percent torque reduction |
|---|---|---|---|---|
| Butanol | 100 | 0 | 0 | 28 |
| 2-ethylhexanol | 100 | 0 | 0 | 0 |
| Alfo 810 [a] | 100 | 0 | 0 | 22 |
| Tridecanol | 100 | 0 | 0 | 11 |
| Neodol 25 [b] | 100 | 0 | 0 | 39 |
| None | 100 | 0 | 0 | 11 |
| 2-ethylhexanol | 25 | 75 | 0 | 54 |
| Do | 50 | 50 | 0 | 77 |
| Do | 75 | 25 | 0 | 34 |
| Hexanol | 50 | 50 | 0 | 71 |
| Octanol | 50 | 50 | 0 | 93 |
| Decanol | 50 | 50 | 0 | 100 |
| Alfo 810 | 50 | 50 | 0 | 93 |
| Neodol 25 | 10 | 90 | 0 | 89 |
| Do | 25 | 75 | 0 | 80 |
| Do | 50 | 50 | 0 | 87 |
| Do | 75 | 25 | | 80 |
| Do | 90 | 10 | | 50 |
| Do [c] | 50 | 50 | 0 | 73 |
| None | 0 | 0 | 100 | 16 |
| Neodol 25 | 50 | 0 | 50 | 50 |
| Do | 5 | 5 | 90 | 43 |
| Do | 5 | 15 | 80 | 64 |
| Do | 10 | 5 | 85 | 57 |
| Do | 10 | 15 | 75 | 93 |
| Do | 25 | 5 | 70 | 57 |
| Do | 25 | 15 | 60 | 71 |
| Do | 25 | 25 | 50 | 86 |
| Do | 25 | 50 | 25 | 93 |

[a] Alfo 810 is a mixture of 45% n-octanol-1 and 55% n-decanol-1 obtainable from Continental Oil Company, Petrochemical Dept.
[b] Neodol 255 is a mixture of n-alkyl primary alcohols having 12 to 15 carbon atoms in the alkyl chain and is obtainable from Shell Chemical Co. Typical properties are as follows: average molecular weight, 207; hydroxyl number, mg. KOH/gm., 271; melting range, °C., 21–23; boiling range (ASTM D–1078), ° C., IBP=270; EP=293, specific gravity, 25/25 °C. 0.834.
[c] Evaluated at a concentration of 2.5 lb./bbl.

The results obtained for several of the compositions are graphically displayed in the drawing from which the remarkable synergism in increasing the lubricity of the drilling fluid is readily apparent. In the drawing the percent reduction in the torque exerted by the drilling fluid is shown for a series of lubricating compositions containing various percentages of sulfated castor oil with three different alcohols. The percentage of alcohol in each lubricating composition is plotted as abscissae and the percent torque reduction as ordinate. It will be noted that whereas 100% sulfated castor oil and 100% 2-ethylhexanol failed to reduce the torque and that 100% Alfo 810 and 100% Neodol 25 reduced the torque by 22% and 39%, respectively, quite remarkably with all intermediate percentages the percent torque reduction was greater than would be calculated by arithmetic means, and indeed greater than that obtained by the use of the sulfated castor oil or alcohol alone.

EXAMPLE 2

Several water base drilling fluids were prepared by mixing together the materials in the amounts listed in Table 2. Three types of water were used in preparing these drilling fluids: (1) fresh water, (2) synthetic sea water prepared by dissolving 42 grams of commercial synthetic sea water salt in 1 liter of fresh water, (3) saturated salt (NaCl) water. These water base drilling fluids were used in evaluating various combinations of alcohols and lubricating additives. Separate additions of the alcohols and the lubricating additives in the amount listed in Table 3 were added to the indicated water base drilling fluid. After mixing 15 minutes with a Multimixer the change in lubricity of the water base drilling fluid was measured using the modified Baroid E.P. Tester.

TABLE 2.—COMPOSITIONS OF WATER BASE DRILLING FLUIDS

| Water base drilling fluid | Lb./bbl. | | | | NaOH | Water | Other materials |
|---|---|---|---|---|---|---|---|
| | Wyoming bentonite | Glen Rose shale | Causticized fero-chrome lignosulfonate | Causticized lignite | | | |
| A | 15 | 80 | 3 | 3 | 0 | Fresh | None. |
| B | 15 | 80 | 3 | 3 | 0 | do | 450 lb./bbl. barite weighting material. |
| C | 20 | 80 | 3 | 3 | 0.5 | do | None. |
| D | 20 | 80 | 2 | 2 | 0.5 | do | Do. |
| E | 20 | a 60 | 0 | 0 | 0.8 | do | 6 lb./bbl. ferro-chrome lignosulfonate. |
| F | 25 | 80 | 2 | 2 | 0.5 | do | None. |
| G | 8 | 50 | 1 | 0 | 0 | S b | Do. |
| H | 43.3 | a 80 | 0 | 0 | (d) | S | 8.3 lb./bbl. ferro-chrome lignosulfonate. |
| I | 8 | 50 | 0 | 0 | 0.1 | SS c | 1 lb./bbl. ferro-chrome lignosulfonate. |
| J | 0 | 50 | 0 | 0 | 0 | SS | 14 lb./bbl. attapulgite clay. | a Grundite shale used in place of Glen Rose shale.
b Synthetic sea water.
c Saturated salt (NaCl) water.
d pH adjusted to 9.5 with sodium hydroxide.

TABLE 3

| Water base drilling fluid | Alcohol | Lb./bbl. | | | Other lubricating additive, lb./bbl. | | Percent torque reduction |
|---|---|---|---|---|---|---|---|
| | | Alcohol | Castor oil | Sulfated castor oil | | | |
| A | | 0 | 0 | 0 | Sulfurized tall oil | 4 | 19 |
| A | Neodol 25 | 4 | 0 | 0 | None | 0 | 30 |
| A | do | 2 | 0 | 0 | Sulfurized tall oil | 2 | 103 |
| B | 2-ethylhexanol | 2 | 0 | 0 | do | 2 | 30 |
| B | Alfo 810 | 2 | 0 | 0 | do | 2 | 27 |
| B | Neodol 25 | 2 | 0 | 0 | do | 2 | 80 |
| B | 2-ethylhexanol | 2 | 0 | 0 | Sulfurized soybean oil | 2 | 33 |
| B | Alfo 810 | 2 | 0 | 0 | do | 2 | 47 |
| B | Neodol 25 | 2 | 0 | 0 | do | 2 | 67 |
| C | None | 0 | 0 | 0 | Sulfurized tall oil | 4 | 13 |
| C | 2-ethylhexanol | 2 | 0 | 0 | do | 2 | 87 |
| C | Alfo 810 | 2 | 0 | 0 | do | 2 | 87 |
| C | 2-ethylhexanol | 2 | 0 | 0 | Sulfurized soybean oil | 2 | 47 |
| C | Alfo 810 | 2 | 0 | 0 | do | 2 | 73 |
| D | None | 0 | 0 | 4 | None | 0 | a (50) |
| D | Neodol 25 | 4 | 0 | 0 | do | 0 | (0) |
| D | do | 2 | 0 | 2 | do | 0 | (81) |
| D | None | 0 | 0 | 0 | Sulfurized tall oil | 4 | (46) |
| D | Neodol 25 | 2 | 0 | 0 | do | 2 | (87) |
| D | do | 2 | 0 | 0 | Sulfurized soybean oil | 2 | (87) |
| E | None | 0 | 6 | 0 | None | 0 | 12 |
| E | do | 0 | 0 | 6 | do | 0 | 18 |
| E | Neodol 25 | 6 | 0 | 0 | do | 0 | 0 |
| E | do | 3 | 3 | 0 | do | 0 | 23 |
| E | do | 3 | 0 | 3 | do | 0 | 41 |
| E | do | 1.5 | 4.5 | 0.5 | do | 0 | 53 |
| F | Neodol 25 | 4 | 0 | 0 | do | 0 | 12 |
| F | None | 0 | 0 | 4 | do | 0 | 7 |
| F | do | 0 | 6 | 0 | do | 0 | 26 |
| F | Neodol 25 | 2 | 4 | 0 | do | 0 | 52 |
| F | do | 2 | 0 | 2 | do | 0 | 59 |
| F | do | 1 | 0 | 3 | do | 0 | 63 |
| F | do | 0.8 | 2.8 | 0.4 | do | 0 | 44 |
| F | None | 0 | 0 | 0 | Sulfurized tall oil | 4 | 15 |
| F | Neodol 25 | 2 | 0 | 0 | do | 2 | 75 |
| F | do | 1 | 0 | 0 | do | 1 | 62 |
| F | do | 2 | 0 | 0 | Sulfurized fatty acid | 2 | 68 |
| F | do | 2 | 0 | 0 | K sulfatricinoleate | 2 | 62 |
| F | do | 1 | 0 | 0 | Sulfated tall oil | 3 | 44 |
| F | do | 2 | 0 | 0 | Sulfated soybean oil | 2 | 50 |
| F | do | 2 | 0 | 0 | Sulfated oleic acid | 2 | 56 |
| F | do | 2 | 0 | 0 | Sulfurized sperm oil | 2 | 63 |
| F | do | 2 | 0 | 0 | Sulfurized soybean oil | 2 | 70 |
| G | do | 4 | 0 | 0 | None | 0 | 0 |
| G | do | 8 | 0 | 0 | do | 0 | 0 |
| G | do | 12 | 0 | 0 | do | 0 | 0 |
| G | None | 0 | 0 | 4 | do | 0 | 23 |
| G | Neodol 25 | 1 | 0 | 3 | do | 0 | 54 |
| G | do | 2 | 0 | 2 | do | 0 | 62 |
| G | do | 3 | 0 | 1 | do | 0 | 62 |
| G | do | 3 | 0 | 0 | Sulfated soybean oil | 3 | 67 |
| G | do | 3 | 0 | 0 | Sulfated tall oil | 3 | 67 |
| H | None | 0 | 6 | 0 | None | 0 | 17 |
| H | do | 0 | 0 | 6 | do | 0 | 12 |
| H | do | 0 | 3 | 3 | do | 0 | 17 |
| H | Neodol 25 | 6 | 0 | 0 | do | 0 | (b) |
| H | do | 2 | 4 | 0 | do | 0 | 13 |
| H | do | 3 | 0 | 3 | do | 0 | 21 |
| H | do | 2 | 2 | 2 | do | 0 | 29 |
| I | one | 0 | 0 | 4 | do | 0 | 29 |
| I | Neodol 25 | 4 | 0 | 0 | do | 0 | 15 |
| I | do | 2 | 0 | 2 | do | 0 | 64 |
| I | do | 2 | 0 | 0 | Sulfurized tall oil | 2 | 43 |
| I | do | 1.33 | 0 | 1.33 | do | 1.33 | 60 |
| J | None | 0 | 0 | 4 | None | 0 | 33 |
| J | Neodol 25 | 4 | 0 | 0 | do | 0 | 13 |
| J | do | 2 | 0 | 2 | do | 0 | 55 |
| J | do | 2 | 0 | 0 | Sulfurized tall oil | 2 | 42 |
| J | do | 2 | 0 | 0 | Sulfurized soybean oil | 2 | 40 | a Values in parenthesis were obtained on the drilling fluids after heating them in a roller oven at 150° F. for 16 hours.
b Increased the torque.

EXAMPLE 3

A 21° deviated hole was being drilled from a platform offshore Louisiana. High drill pipe torque is common in this type of directional drilling. A 16 lb./gal. fresh water lignite-lignosulfonate drilling fluid was being used to drill the typical Gulf Coast formations of the West Delta area. The drilling rate was 6 ft./hr. at a rotary speed of 120 r.p.m. with a weight on bottom of 10,000 lb. A diamond bit was being used.

Treatment of this drilling fluid with a lubricating composition comprising 65% castor oil, 5% sulfated castor oil, 10% Neodol 25 and 20% isopropanol was undertaken. The lubricating composition was added to the drilling fluid directly below a shale shaker at a rate of approximately 30 minutes per drum. Following the addition of approximately 1.5 lb./bbl. the torque meter on the floor of the drilling rig showed a torque reduction from 75 amps to 50 amps. A total of 3 lb./bbl. was added. After the first circulation of the drilling fluid containing this concentration of the lubricating composition the torque reading was 25 amps. The weight on the bit was increased to 14,000 lb. with no increase in torque. The drilling rate increased to 8 ft./hr. For maintenance treatment, 0.5 lb./bbl./day of the lubricating composition was added. Two days later the maintenance treatment was cut to 0.25 lb./bbl./day. The water base drilling fluid maintained excellent lubricity.

EXAMPLE 4

The lubricating composition given in Example 3 was evaluated in a 10.8 lb./gal. fresh water lignosulfonate drilling fluid used in a drilling process offshore Texas. Information available at the drilling rig indicated that (1) 2,000 amps was required to turn the rotary table, (2) an excess of 20,000 pounds of drag occurred on connections, (3) the penetration rate was 23 ft./hr., and (4) that severe bit balling was occurring. The lubricating composition was added to the drilling fluid through the mud hopper at a rate of one drum every six minutes. A total of 5.6 lb./bbl. was added. Immediately after addition of the lubricity composition the amperage required to turn the rotary table was 700 amps, no excess drag occurred on subsequent connections, the penetration rate increased to 36 ft./hr., and bit balling was not apparent. The mud exhibited excellent lubricity.

EXAMPLE 5

Five water base drilling fluids were prepared by mixing together the following materials in the stated amounts:

Fluid A—fresh water only.

Fluid B—72 gm. of sodium chloride and 0.25 gm. of sodium metasilicate in fresh water to give a volume of 350 ml.;

Fluid C—20 gm. of Wyoming bentonite in 350 ml. of fresh water;

Fluid D—20 gm. of Wyoming bentonite, 60 gm. of Glen Rose shale, 4 gm. of ferro-chrome lignosulfonate, and 0.6 gm. of sodium hydroxide in 350 ml. of fresh water;

Fluid E—40 gm. of Wyoming bentonite, 100 gm. of Glen Rose shale, 4 gm. of ferro-chrome lignosulfonate, and 3 gm. of sodium hydroxide in 350 ml. of synthetic sea water prepared by dissolving 42 gm. of commercial synthetic sea water salt in one liter of fresh water.

The lubricating composition given in Example 3 was evaluated using the modified Baroid E.P. Tester in Fluid A, Fluid B, Fluid C, and Fluid D at a concentration of one lb./bbl. and in Fluid E at a concentration of three lb./bbl. The following reductions in torque were obtained:

| | Percent |
|---|---|
| Fluid A | 82 |
| Fluid B | 91 |
| Fluid C | 85 |
| Fluid D | 75 |
| Fluid E | 20 |

While certain illustrative embodiments of the present invention are herein described in considerable detail, it should be understood that there is no intention to limit the invention to the specific compounds disclosed. On the contrary, the intention is to cover all modifications, alternative steps and equivalents falling within the spirit and scope of the invention as expressed in the claims.

Having described the invention, we claim:

1. In a rotary drilling process for drilling a well in which a water base drilling fluid is circulated down the drill pipe and up through the annular space between the drill pipe and the sides of the borehole, and method of reducing the friction required to rotate the drill pipe, which comprises admixing with said water base drilling fluid a lubricating additive selected from the group consisting of vegetable oils, sulfurized vegetable oils, sulfated vegetable oils, sulfurized tall oil, and mixtures thereof, and a water insoluble alkyl alcohol having from 8 to 15 carbon atoms, such that said additive and said alcohol are dispersed as discrete small non-emulsified droplets in said fluid, and contacting the drill pipe and the sides of the borehole with said drilling fluid, wherein the weight ratio of said lubricating additive to said alcohol is from about 19:1 to 1:9, and wherein the combined amount of said lubricating additive and said alcohol is sufficient to synergistically reduce the power required to rotate the drill pipe.

2. The method of claim 1 wherein said lubricating additive is selected from the group consisting of vegetable oils, sulfated vegetable oils, and mixtures thereof.

3. The method of claim 2 wherein the combined amount of said lubricating additive and said alcohol is from about 1 pound to about 12 pounds per 42 gallon barrel of said drilling fluid.

4. The method of claim 2 wherein said lubricating additive is selected from the group consisting of castor oil, sulfated castor oil, and mixtures thereof.

5. The method of claim 4 wherein the combined amount of said lubricating additive and said alcohol is from about 1 pound to about 12 pounds per 42 gallon barrel of said drilling fluid.

6. The method of claim 4 wherein said alcohol is a primary alcohol having from 12 to 15 carbon atoms, and wherein the combined amount of said lubricating additive and said alcohol is from about 1 pound to about 12 pounds per 42 gallon barrel of said drilling fluid.

7. A lubricating composition for synergistically increasing the lubricity of a water base drilling fluid when dispersed as discrete small non-emulsified droplets in said fluid, consisting essentially of:

(1) 5% to 40% of a water insoluble alkyl alcohol having from 8 to 15 carbon atoms;

(2) 30% to 90% of a lubricating additive selected from the group consisting of vegetable oils, sulfurized vegetable oils, sulfated vegetable oils, sulfurized tall oil, and mixtures thereof; and (3) 5% to 30% of a pour point depressant selected from the group consisting of methanol, ethanol, n-propanol, isopropanol, ethylene glycol, propylene glycol, and mixtures thereof.

8. A lubricating composition of claim 7 wherein said lubricating additive is selected from the group consisting of vegetable oils, sulfated vegetable oils, and mixtures thereof.

9. A lubricating composition of claim 8 wherein said lubricating additive is selected from the group consisting of castor oil, sulfated castor oil, and mixtures thereof.

10. A lubricating composition of claim 9 wherein said pour point depressant is isopropanol.

11. A lubricating composition of claim 10 wherein said alcohol is present in the amount of 10%, said castor oil is present in the amount of 65%, said sulfated castor oil is present in the amount of 5%, and said isopropanol is present in the amount of 20%.

12. A lubricating composition of claim 11 wherein said alcohol is a mixture of n-alkyl primary alcohols having an average molecular weight of 207 and having from 12 to 15 carbon atoms.

References Cited

UNITED STATES PATENTS

| | | | |
|---|---|---|---|
| 3,481,870 | 12/1969 | Cheng et al. | 252—8.3 |
| 3,047,493 | 7/1962 | Rosenberg | 252—8.5 |
| 3,027,324 | 3/1962 | Rosenberg | 252—8.5 |
| 3,594,317 | 7/1971 | Estes et al. | 252—8.5 |
| 3,284,352 | 11/1966 | Burdyn et al. | 252—8.5 |
| 2,094,127 | 9/1937 | Lazier | 252—52 |
| 2,271,696 | 2/1942 | Jones | 252—8.5 |

OTHER REFERENCES

Mondshine: Ddrilling Mud Lubricity, article in the Oil and Gas Journal, vol. 68, No. 49, Dec. 7, 1970, pp. 70, 71, 72 and 77.

Rosenberg et al.: Article in Journal of Petroleum Technology, vol. 11, August 1959, pp. 195–202.

HERBERT B. GUYNN, Primary Examiner

U.S. Cl. X.R.

252—38.6, 49.3, 49.5, 52 R, 56 R